United States Patent
Lammers et al.

(10) Patent No.: US 8,405,500 B2
(45) Date of Patent: Mar. 26, 2013

(54) SYSTEM AND METHOD FOR POWER AND DATA DELIVERY ON A MACHINE

(75) Inventors: Bryan G. Lammers, Peoria Heights, IL (US); James I. Portscheller, Sparland, IL (US); Paul G. Casperson, Peoria, IL (US); John W. Crayton, Peoria, IL (US); David C Freeman, Mapleton, IL (US)

(73) Assignee: Caterpillar Inc., Peoria, IL (US)

( * ) Notice: Subject to any disclaimer, the term of this patent is extended or adjusted under 35 U.S.C. 154(b) by 2195 days.

(21) Appl. No.: 11/311,595

(22) Filed: Dec. 19, 2005

(65) Prior Publication Data

US 2006/0097864 A1 May 11, 2006

Related U.S. Application Data

(63) Continuation-in-part of application No. 11/257,571, filed on Oct. 25, 2005, now abandoned.

(60) Provisional application No. 60/626,813, filed on Nov. 10, 2004.

(51) Int. Cl.
*G08B 1/08* (2006.01)

(52) U.S. Cl. ............. 340/538.11; 340/425.5; 340/10.1

(58) Field of Classification Search ............. 340/310.11
See application file for complete search history.

(56) References Cited

U.S. PATENT DOCUMENTS

| | | | |
|---|---|---|---|
| 2,627,537 A | 2/1953 | Weisberg | |
| 3,935,637 A | 2/1976 | Bunnell | |
| 4,075,758 A | 2/1978 | Parsons et al. | |
| 4,130,934 A | 12/1978 | Asick et al. | |
| 4,463,341 A | 7/1984 | Iwasaki | |
| 4,479,692 A | 10/1984 | Greenwood et al. | |
| 4,533,199 A | 8/1985 | Feldberg | |
| 4,641,904 A * | 2/1987 | Kosugi et al. | 439/404 |
| 4,721,471 A | 1/1988 | Mueller | |
| 4,933,668 A | 6/1990 | Oyer et al. | |
| 4,956,561 A | 9/1990 | Tamer et al. | |
| 5,041,012 A | 8/1991 | Caprio | |
| 5,148,144 A | 9/1992 | Sutterlin et al. | |
| 5,305,316 A | 4/1994 | Yoshida et al. | |
| 5,589,813 A | 12/1996 | Nielsen | |
| 5,626,489 A | 5/1997 | Marshall et al. | |
| 5,647,757 A | 7/1997 | Chrysostomou | |
| 5,745,027 A | 4/1998 | Malville | |
| 5,859,584 A | 1/1999 | Counsell et al. | |
| 5,886,619 A | 3/1999 | Takasan et al. | |
| 6,034,988 A | 3/2000 | VanderMey et al. | |
| 6,036,535 A | 3/2000 | Whiteman, Jr. et al. | |
| 6,179,644 B1 | 1/2001 | Adams et al. | |
| 6,188,314 B1 | 2/2001 | Wallace et al. | |
| 6,198,244 B1 | 3/2001 | Hayden et al. | |
| 6,305,967 B1 | 10/2001 | Smith, III | |
| 6,326,704 B1 | 12/2001 | Breed et al. | |
| 6,373,377 B1 | 4/2002 | Sacca et al. | |
| 6,512,307 B1 | 1/2003 | Ilg | |
| 6,552,443 B1 | 4/2003 | Joehnke et al. | |
| 6,563,419 B1 | 5/2003 | Herz et al. | |
| 6,577,230 B1 | 6/2003 | Wendt et al. | |

(Continued)

*Primary Examiner* — Brian Zimmerman
*Assistant Examiner* — Omer S Khan
(74) *Attorney, Agent, or Firm* — Kevin C. Earle; Finnegan, Henderson, Farabow, Garrett & Dunner LLP

(57) ABSTRACT

A power and data delivery system for a machine. The system includes a power and data conductor located throughout at least a portion of the machine, a plurality of processing nodes, each connected to the conductor at various locations, and a plurality of devices, each connected to a corresponding one of the plurality of processing nodes and controlled by the processing node, wherein each processing node may be connected at any location of the conductor.

28 Claims, 12 Drawing Sheets

U.S. PATENT DOCUMENTS

| | | |
|---|---|---|
| 6,749,456 B1 * | 6/2004 | Conner et al. ............ 439/410 |
| 6,756,881 B2 | 6/2004 | Bateman et al. |
| 6,921,293 B2 | 7/2005 | Takada et al. |
| 7,429,186 B2 * | 9/2008 | Mrakovich et al. ........ 439/404 |
| 2002/0086567 A1 * | 7/2002 | Cash, Jr. ............ 439/106 |
| 2002/0113492 A1 | 8/2002 | Sakamoto et al. |
| 2003/0045970 A1 | 3/2003 | Mayanka |
| 2003/0067910 A1 | 4/2003 | Razazian et al. |
| 2003/0088706 A1 | 5/2003 | Chan et al. |
| 2003/0156012 A1 | 8/2003 | Omidi et al. |
| 2003/0158640 A1 | 8/2003 | Pillar et al. |
| 2003/0184433 A1 | 10/2003 | Zalitzky et al. |
| 2003/0215032 A1 | 11/2003 | Langalis et al. |
| 2004/0002250 A1 | 1/2004 | Kolle et al. |
| 2004/0087214 A1 | 5/2004 | Cho |
| 2004/0131189 A1 | 7/2004 | Lawton et al. |

* cited by examiner

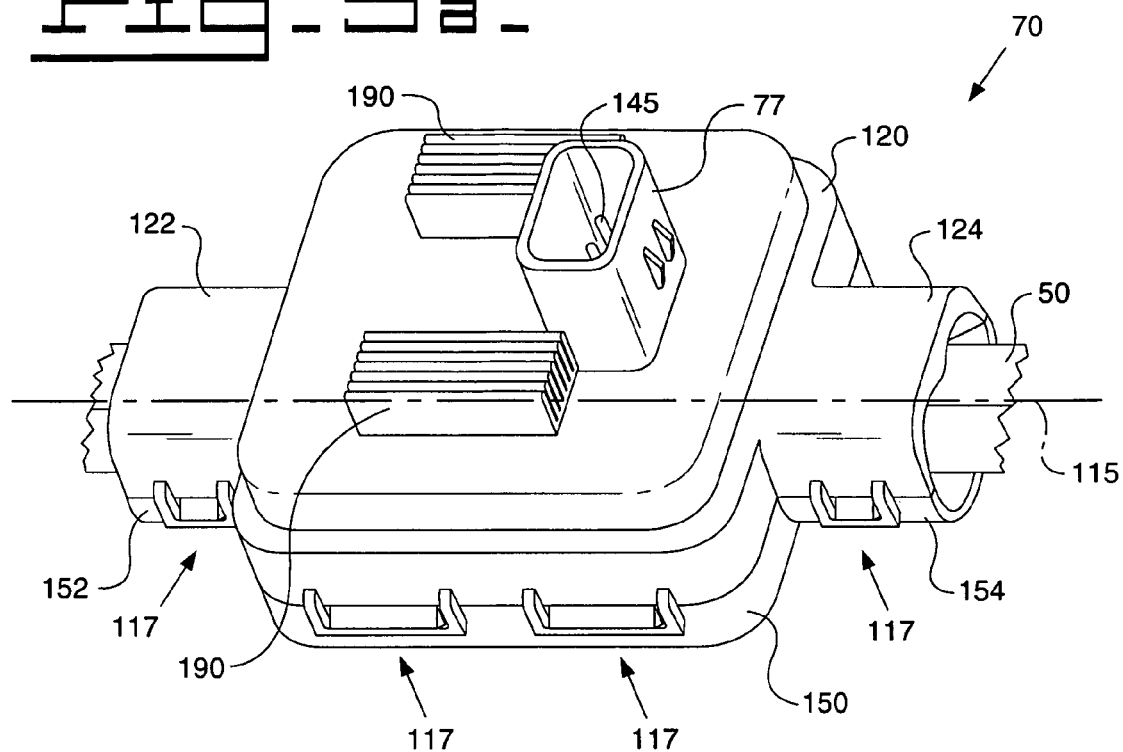
Fig_5a_
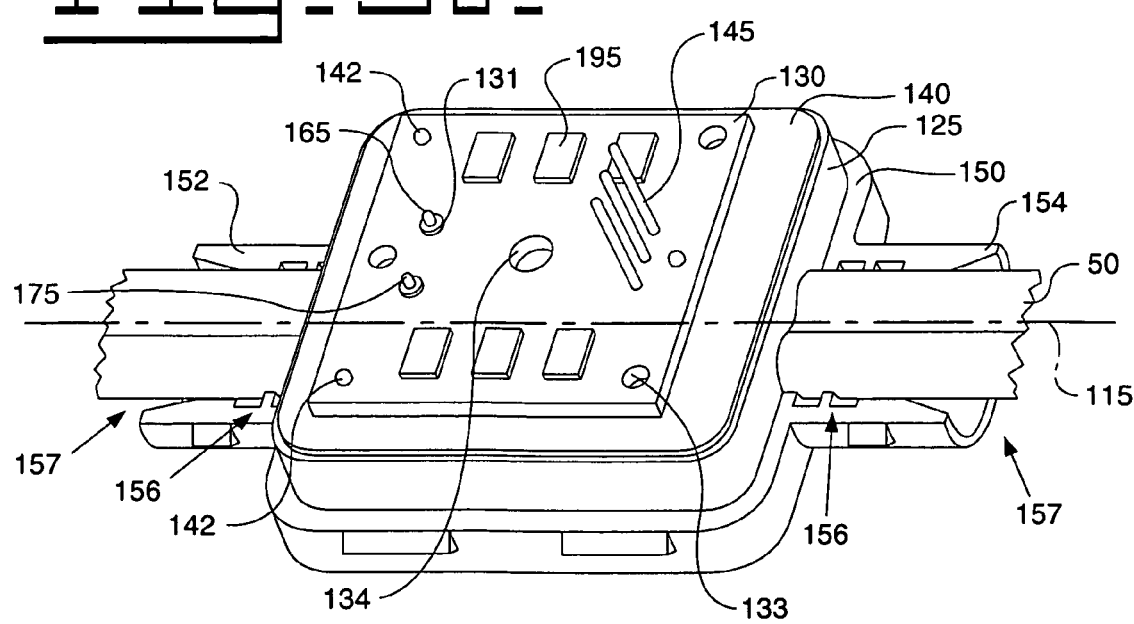
Fig_5b_

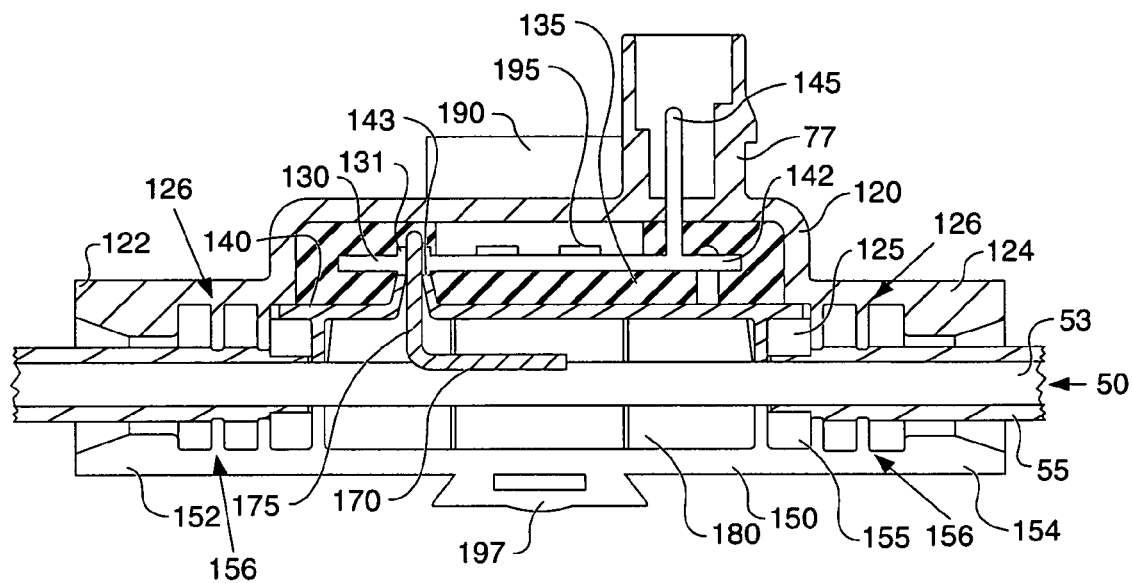
Fig_5f_
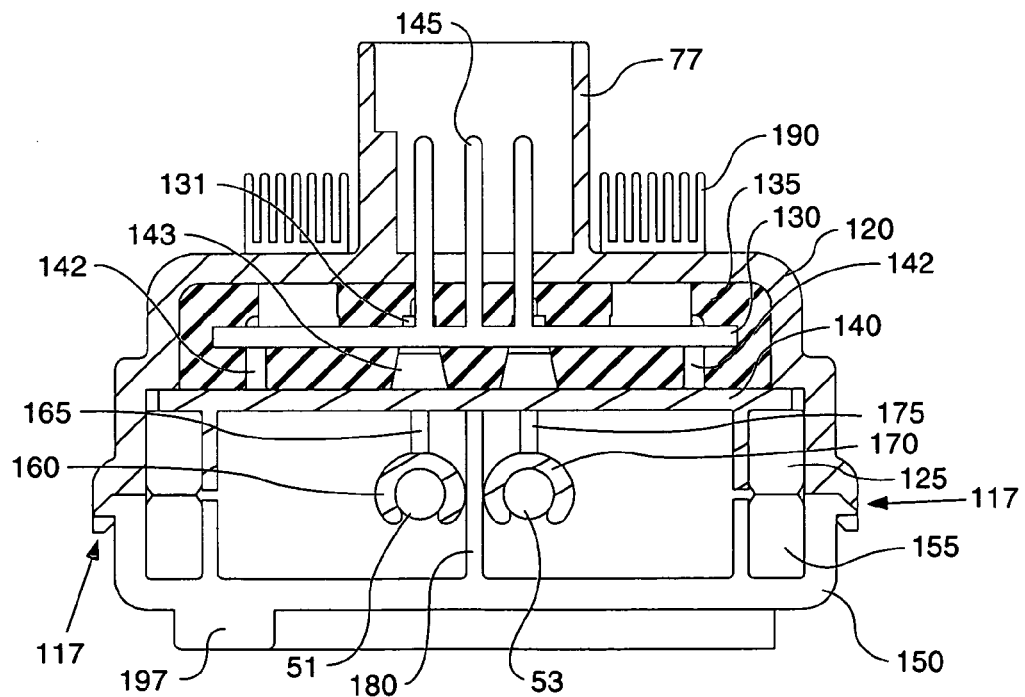
Fig_5g_

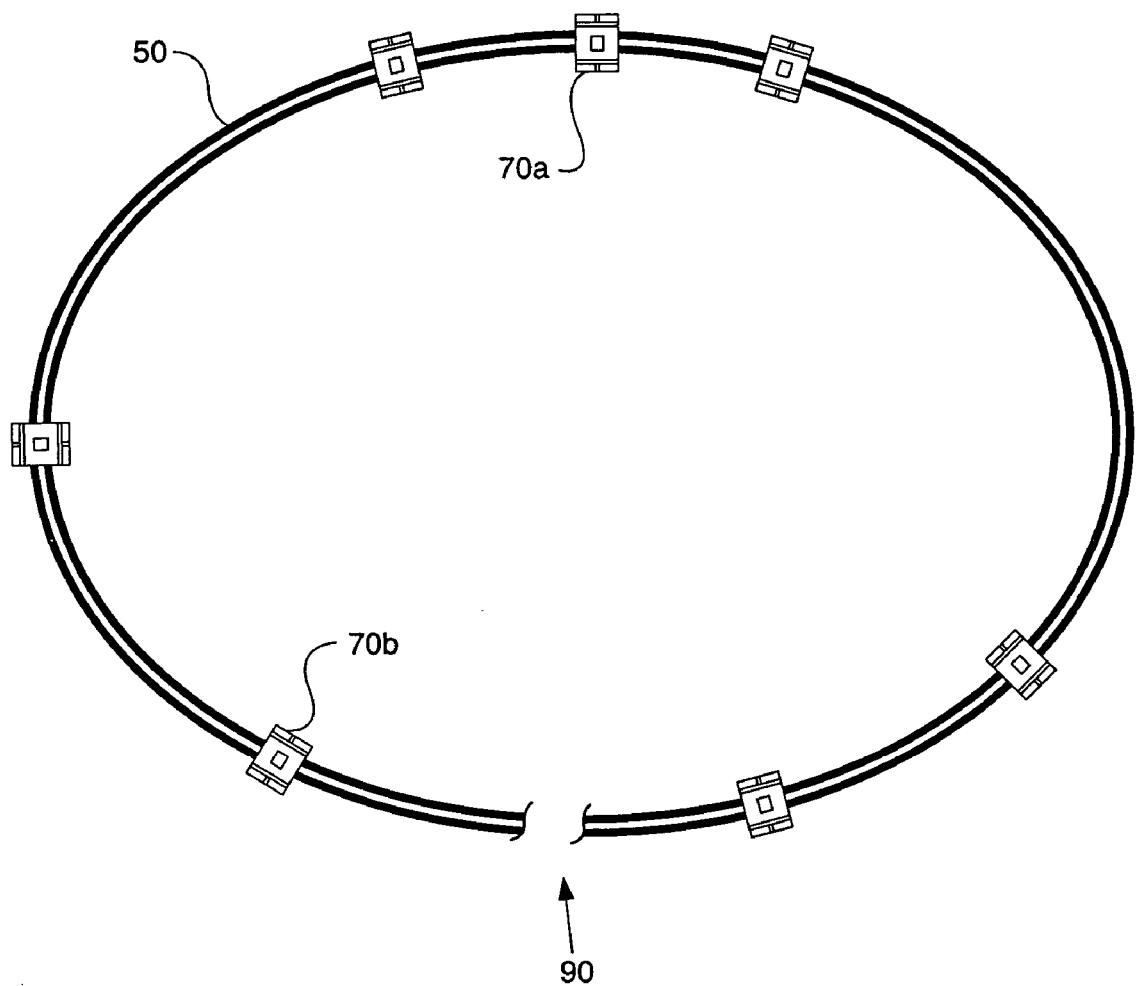

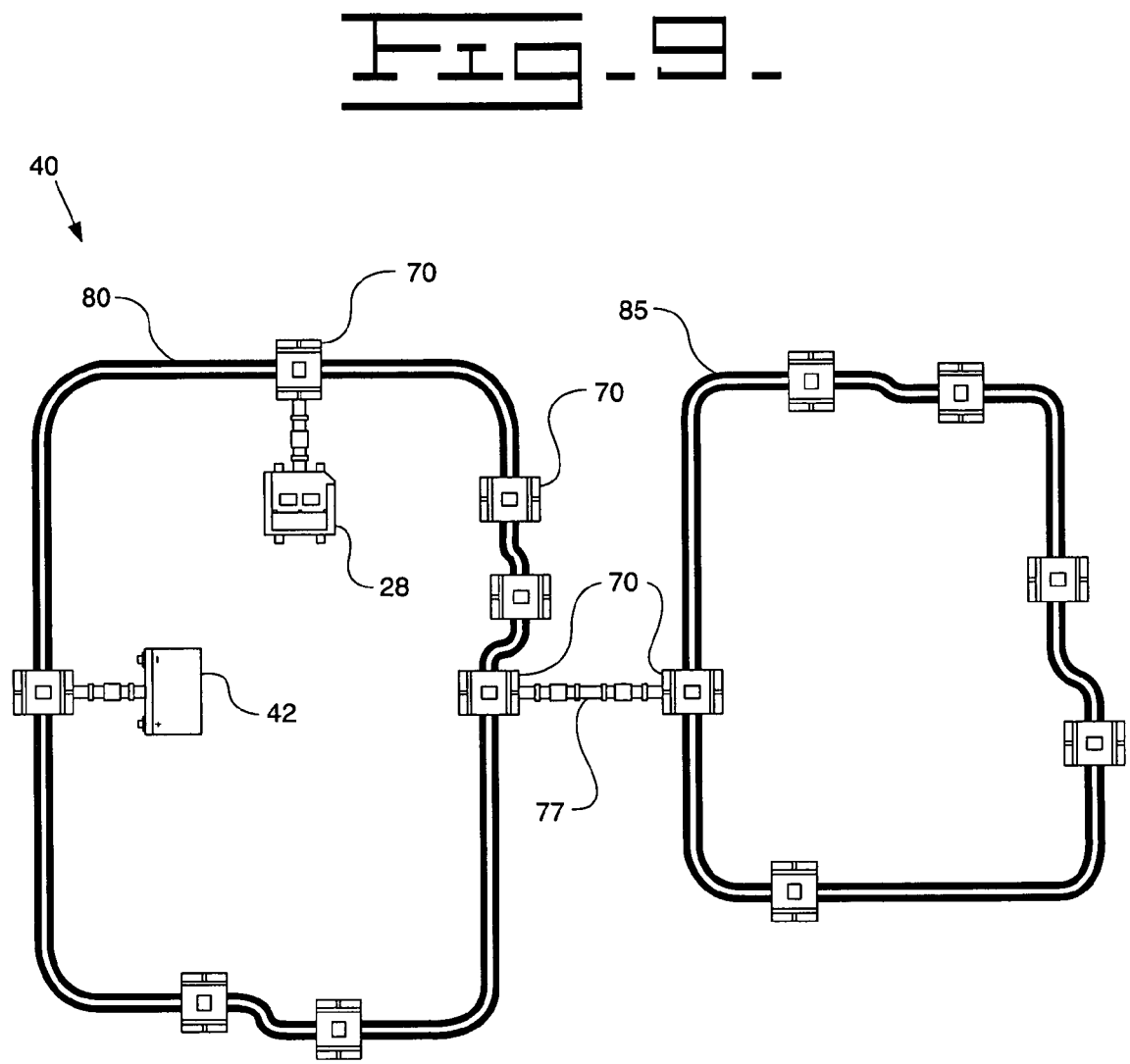

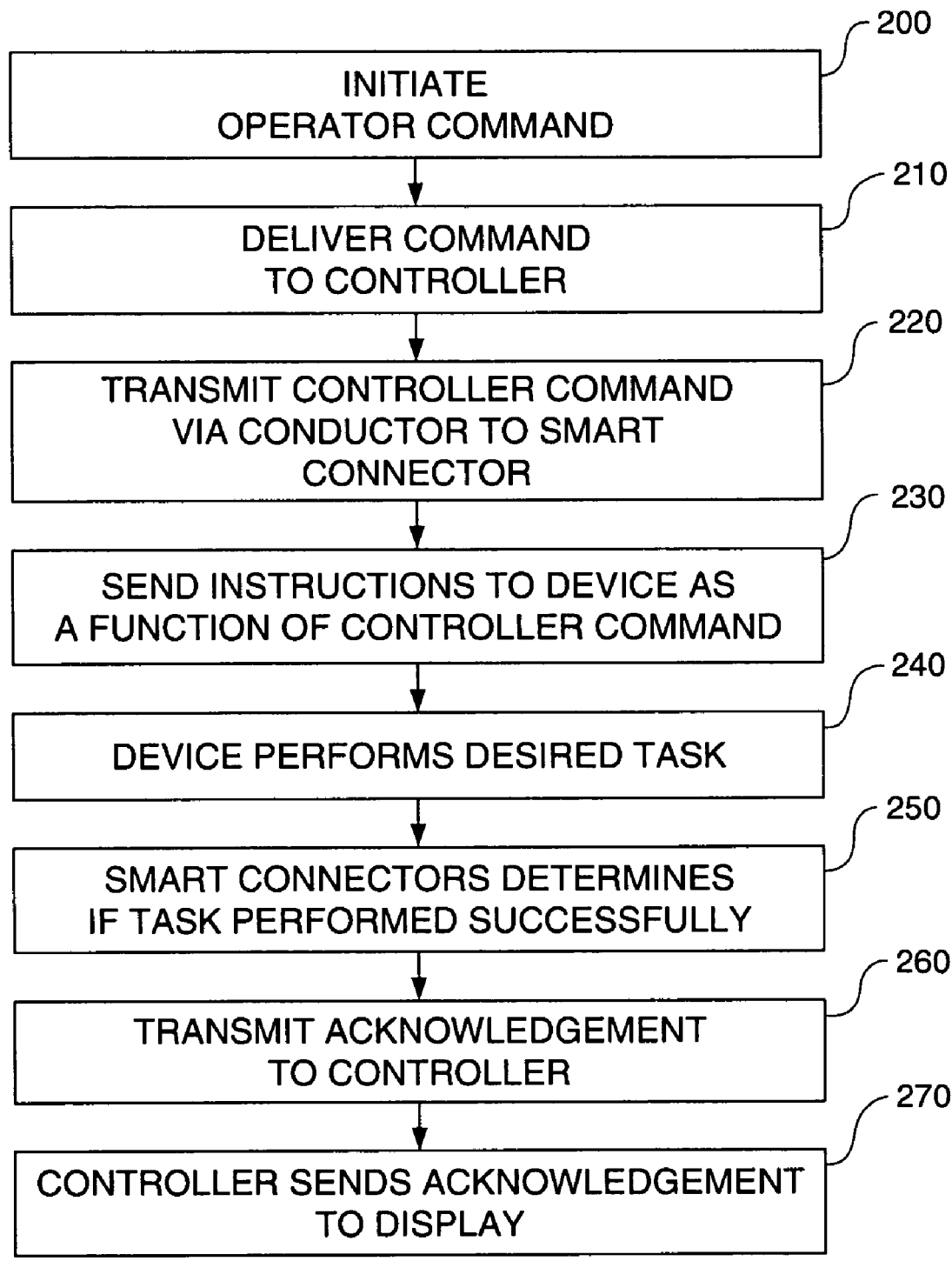

SYSTEM AND METHOD FOR POWER AND DATA DELIVERY ON A MACHINE

RELATION TO OTHER PATENT

This application is a continuation-in-part of patent application Ser. No. 11/257,571, filed on Oct. 25, 2005 now abandoned, which claims priority to provisional application No. 60/626,813, filed on Nov. 10, 2004.

TECHNICAL FIELD

The present invention relates generally to a system and method for distributed communications on machines and more particularly to a system and method for data and power delivery over the same conductors.

BACKGROUND

Machines are used to perform a wide variety of job functions, and may be mobile or stationary. For example, a typical machine is shown in FIG. 1 as a wheel loader, and is used for many earthworking and construction tasks. Other types of machines may include trucks, automobiles, marine craft, aircraft, dozers, graders, excavators, tractor trailers, trains, stationary electric power generators, and many others.

Typically, machines are powered, controlled and monitored using electric and electronic technology, which involves the use of electrical conductors to supply power and data to various components and locations. Traditionally, power and data are delivered on separate conductors. In machines such as this, an operator may control devices from a central location with data routed through independent data conductors dedicated to each device. Similarly, the power for any of these machines would normally originate at a power source and connect to a central location, typically a fuse block, for independent distribution on power conductors to locations throughout the machine.

In current systems, two or more conductors are required for each device. The total number of conductors required increases proportionally to the number of devices used by the machine, and the number is ever increasing. Future machines will require even more devices than do present machines. To minimize assembly problems on current machines, the conductors are bundled into complex and cumbersome wiring harnesses. With a larger number of conductors, the wiring harnesses become proportionally larger and proportionally harder to route around the machine. The cost and weight of the wiring harnesses also increases proportionally and the time to troubleshoot increases exponentially. For ease of assembly, harnesses use connectors. Large harnesses require large and expensive connectors. The addition of even one new device may require harness replacement or modification. Even when the desired conductors for service or modification are found, they may not be in a convenient location to perform the needed work to connect to the new device. Unfortunately, because of the ever-increasing percentage of machine functions being performed electronically, the problems will only continue to multiply.

Multiplexing has been used to try to reduce the number of individual conductors needed for electrical communication. Multiplexing is typically used to send multiple messages on a single pair of signal conductors to separate or independent receivers of electrical data. However, present day techniques of multiplexing groups of electrical functions are only partially solving system complexity problems and are merely creating additional layers of electrical hierarchy rather than reducing complexity of the electrical systems. Although these systems and methods may be adequate for the speed and bandwidth of some of today's electrical functions, speed and capacity become a significant problem as signal activity continues to increase.

Attempts have also been made to use a data communication system where data and power are routed over the same conductors. For example, it is known in motor vehicles to arrange functional devices to communicate with each other through supply conductors connected to the battery of the vehicle by means of a carrier current technique. One such example of a data communication system employing the use of carrier currents is disclosed by U.S. Pat. No. 5,745,027, to Malville. Malville, however, does not disclose features which would enable a combination of power and data delivery throughout a machine. For example, Malville does not disclose smart connectors that connect devices to a wire bus that are configured to communicate and work with other smart connectors. Malville also does not disclose techniques in which smart connectors are readily connected to the bus at any desired location during assembly, maintenance or upgrades. Furthermore, Malville does not disclose techniques for delivering large amounts of data over a combined power and data delivery bus that accounts for and compensates for data interference in harsh environments.

In U.S. Pat. No. 5,727,025, Maryanka discloses a system that allows for voice, music, video and data to be transmitted over direct current wires. The system of Maryanka, however, does not disclose the use of smart connectors in that the interface between devices and the direct current wires has no capability to interpret commands and control devices based on decision making. Maryanka's system also does not include techniques for smart connectors being readily connected at any desired locations on the direct current lines.

SUMMARY OF THE INVENTION

It is to be understood that both the foregoing general description and the following detailed description are exemplary and explanatory only and are not restrictive of the invention as claimed.

One aspect of the present invention is directed to a connector for a power and data delivery system. The connector comprises a base housing and a top housing. The base housing has a longitudinal axis and includes a base conductor channel and at least one conductor contact. The base conductor extends along the longitudinal axis and provides a through path for a power and data delivery conductor. The at least one conductor contact has at least one corresponding prong extending transverse the longitudinal axis. The top housing includes a top conductor channel, a circuit board, and a connector interface. The top conductor channel corresponds to the base conductor channel. The circuit board has at least one connector pin and is positioned to receive the at least one prong. The circuit board is also configured to separate a power signal from a data signal. The connector interface is positioned to receive the at least one connector pin.

Another aspect of the present invention is directed to a method for attaching a connector to a conductor. The method comprises attaching a conductor contact to each of at least one conductor wires, the conductor contact having a prong extending transverse a longitudinal axis of the conductor, positioning the conductor in a base conductor channel of a base housing located along the longitudinal axis, positioning a circuit board in the top housing, and attaching a top housing to the base housing such that each prong extends through the top housing to a connector interface.

Another aspect of the present invention is directed to a power and data delivery system for a machine. The system comprises a conductor located throughout at least a portion of the machine, a plurality of connectors, each connected to the conductor at a respective desired location, and a plurality of devices, at least one being connected to a corresponding one of the plurality of connectors and controlled by a corresponding processor, wherein the desired location may be located at any point along the conductor. The plurality of connectors include a base housing, a top housing configured to connect to the base housing, and a circuit board located in the top housing a configured to electrically connect to the conductor.

BRIEF DESCRIPTION OF THE DRAWINGS

The accompanying drawings, which are incorporated in and constitute a part of this specification, illustrate several exemplary embodiments of the invention and, together with the description, serve to explain the principles of the invention. In the drawings.

FIG. 5a is a perspective view of a smart connector according to another embodiment of the present disclosure;

FIG. 5b is a perspective view of the smart connector in FIG. 5a with a connector top housing removed;

FIG. 5f is a cross section diagram of the smart connector of FIG. 5a parallel to the conductor;

FIG. 5g is a cross section diagram of the smart connector of FIG. 5a perpendicular to the conductor;

FIG. 8 shows diagrammatically a power and data delivery system 40 according to another embodiment of the present disclosure FIG. 9 shows diagrammatically a power and data delivery system according to another embodiment of the present disclosure; and FIG. 10 is a flow diagram depicting steps of operation of a power and data delivery system according to one embodiment of the present disclosure.

DETAILED DESCRIPTION

Reference will now be made in detail to embodiments of the invention, examples of which are illustrated in the accompanying drawings. Whenever possible, the same reference numbers will be used throughout the drawings to refer to the same or like parts.

Figure 1:
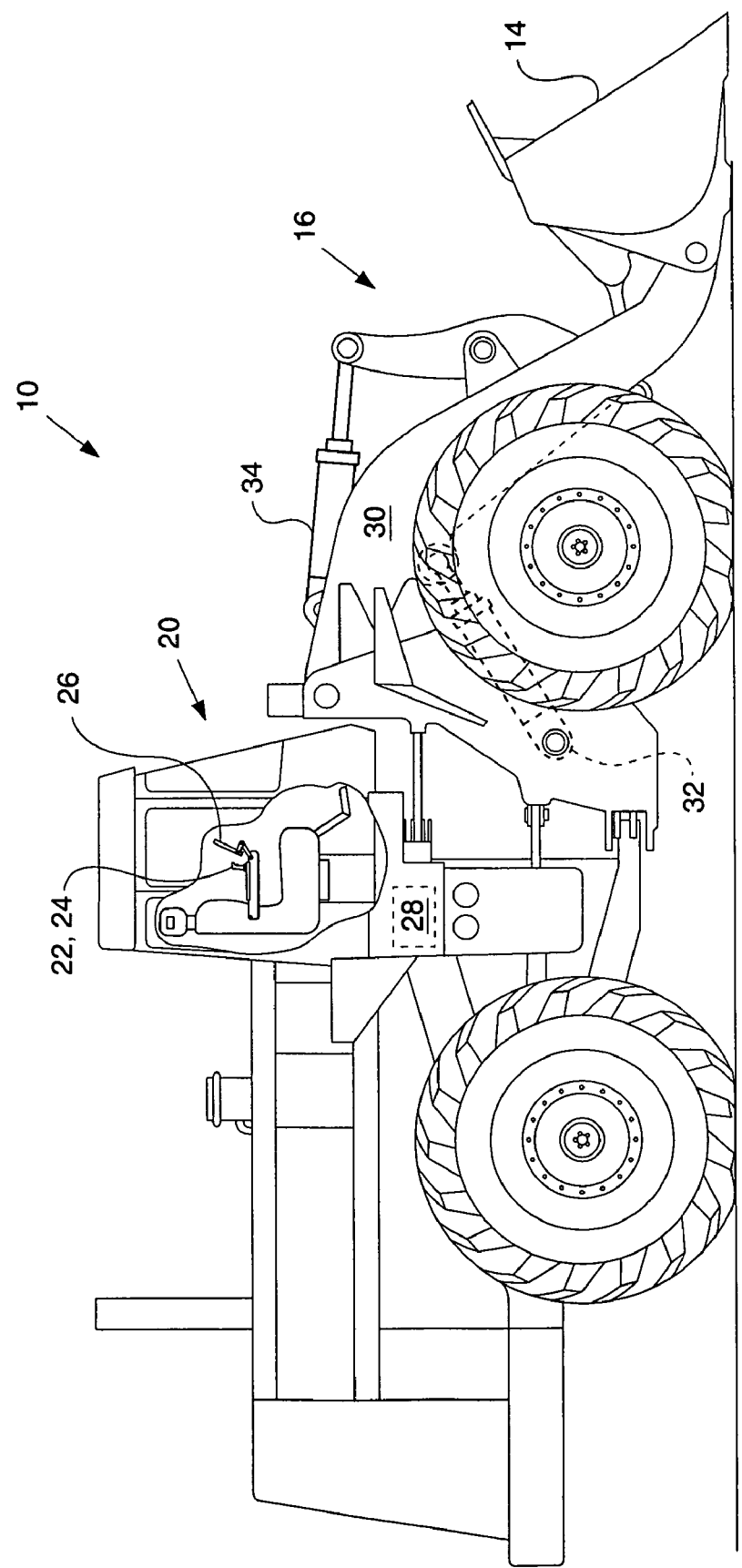
FIG. 1 shows a diagrammatic illustration of a machine where one embodiment of the present disclosure may be employed.

FIG. 1 shows a diagrammatic illustration of a machine 10 where one embodiment of the present disclosure may be employed. Although the machine 10 is shown as a wheel loader, the machine 10 may be any kind of mobile or stationary machine that generally has a need for data communications and power to be transmitted from one area on the machine 10 to another to enable the execution of an operation. For example, mobile machines may include wheel loaders, excavators, track type loaders, dump trucks, garbage trucks, marine propulsion systems, locomotives, etc. Stationary machines may include power generation systems, machining systems or other manufacturing tools and systems, etc.

The machine 10 displayed in FIG. 1 is shown having a variety of devices 60, including a power source (not shown), an implement 14, a lift mechanism 16, and an operator control station 20. The operator station 20 may include additional devices 60, such as a lift control device 22, a steering control device 24, and a display 26. The lift control device 22 and steering control device 24 may be a single device or separate devices to control lift and steering functions on the machine. The operator station 20, although shown here as being on the machine 10, may be on the machine itself or at a location remote from the machine 10. The machine 10 may also include at least one controller 28, the controller also being a type of device 60. The controller 28 preferably includes programming specific to the machine 10, but it should be appreciated that various aspects of the controller 28 may be common to all machines 10. The controller 28 may be microprocessor based, as is known in the art. In addition, the controller 28 may be one of a number of controllers for controlling different functions. The controller 28 may also control subservient controllers.

The machine 10 may have an implement 14 controllably attached to the machine 10 by the lift mechanism 16. The lift mechanism 16 may include a lift linkage 30 that may be hydraulically actuated by one or more hydraulic cylinders. In particular, lift linkage 30 and implement 14 may be controlled by lift cylinder 32 and tilt cylinder 34 to lift and tilt the implement 14.

Figure 2:
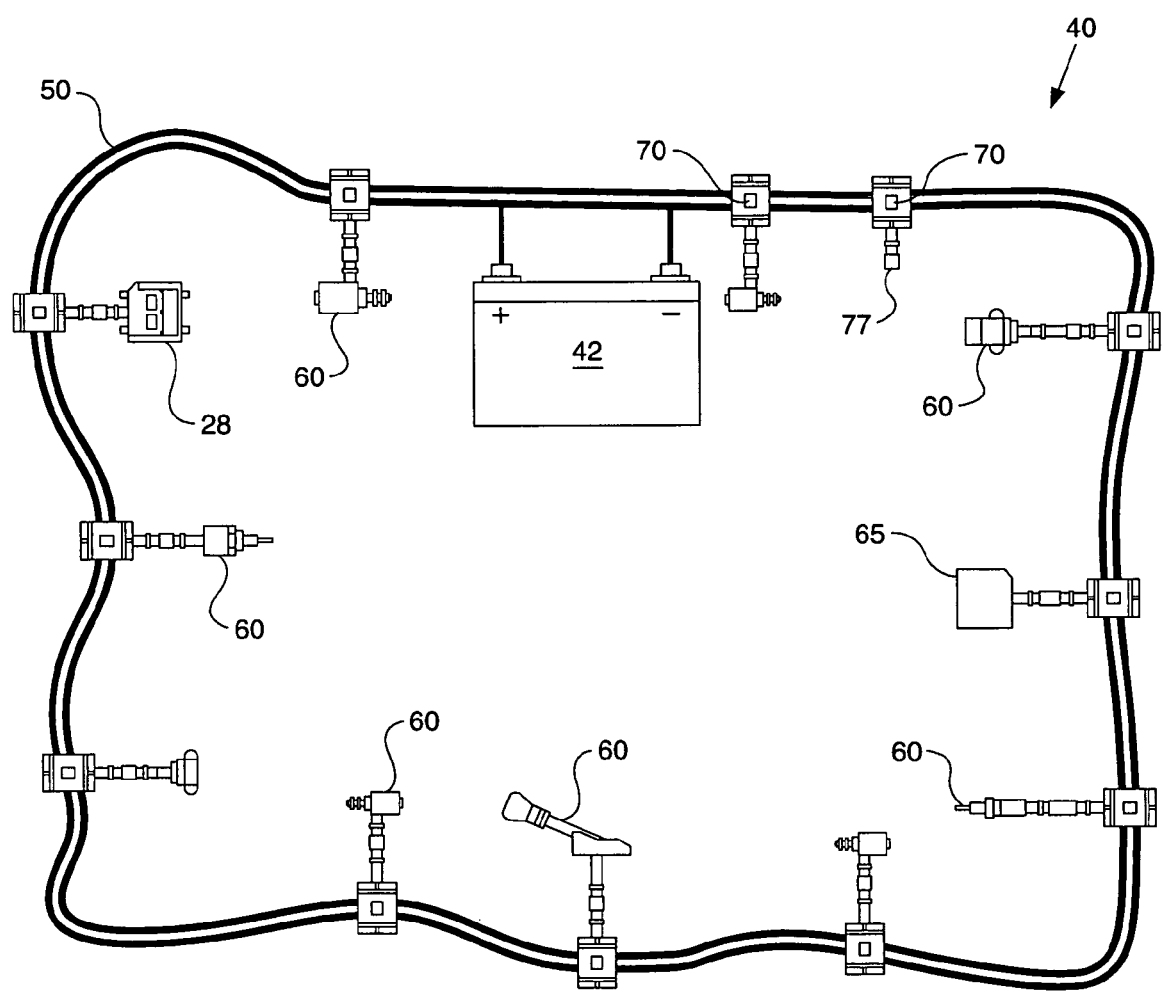
FIG. 2 shows diagrammatically a power and data delivery system according to one embodiment of the present disclosure.

FIG. 2 shows diagrammatically a power and data delivery system 40 according to one embodiment of the present disclosure. The power and data delivery system 40 is arranged throughout the machine 10 and is connected to a power supply 42. The power and data delivery system 40 may include conductors such as a two-wire configuration, but may also include other configurations including, but not limited to, a one-wire configuration, for example with a common chassis ground. The power and data delivery system 40 may be arranged such that a conductor 50 is operably connected to all devices 60 requiring communication with the controller 28 or with other devices 60, and also requiring power from the power supply 42. The transfer of data and power preferably occurs over the same conductor 50. In addition to the devices 60 mentioned above, devices 60 may include, but are not limited to, solenoids, sensors, relays, throttle shifters, lights, alarms, and any other electrical device that may be present on the machine 10 or other machines. Devices 60 are operably connected to the conductor 50 via smart connectors 70. A smart connector 70 may also be characterized as a processing node. Each device 60 may have its own smart connector 70, as shown in FIG. 2.

Alternatively, the power and data delivery system 40 may be arranged and utilized on a portion of the machine 10. This may occur where new devices 60 are added to a machine 10 already having a wiring setup, such as a wiring harness. Furthermore, multiple systems 40 may be used on a machine 10. For example, a first system may be installed for the operator station of the machine 10 while a second system 40 may be installed for the rest of the machine 10. Similarly, separate systems 40 may also be used for cooling systems, implements, and the like. The systems 40 may then be connected to one another via smart connectors 70.

Figure 3:
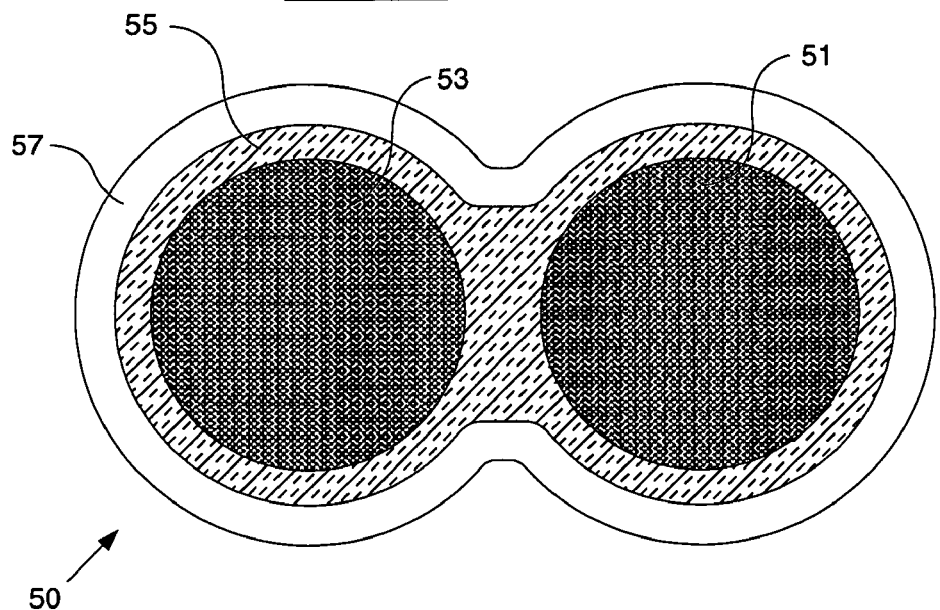
FIG. 3 is a cross section diagram of a conductor according to one embodiment of the present disclosure.

FIG. 3 is a cross section of the conductor 50 according to one embodiment of the present invention. The conductor 50 comprises a positive line 51 and a negative line 53. Each of the positive and negative lines 51, 53 may be made from a finely stranded material, such as copper, aluminum, or other material. The positive and negative lines 51, 53 may be disposed within an insulation 55 that electrically insulates and protectively surrounds the positive and negative lines 51, 53. Sheathing 57 may be arranged about the insulation 55 for an additional layer of protection from abrasion as well as to prevent electro-magnetic interference (EMI) or emissions. Alternatively, the insulation 55 and sheathing 57 may be integrated as one component.

Figure 4:
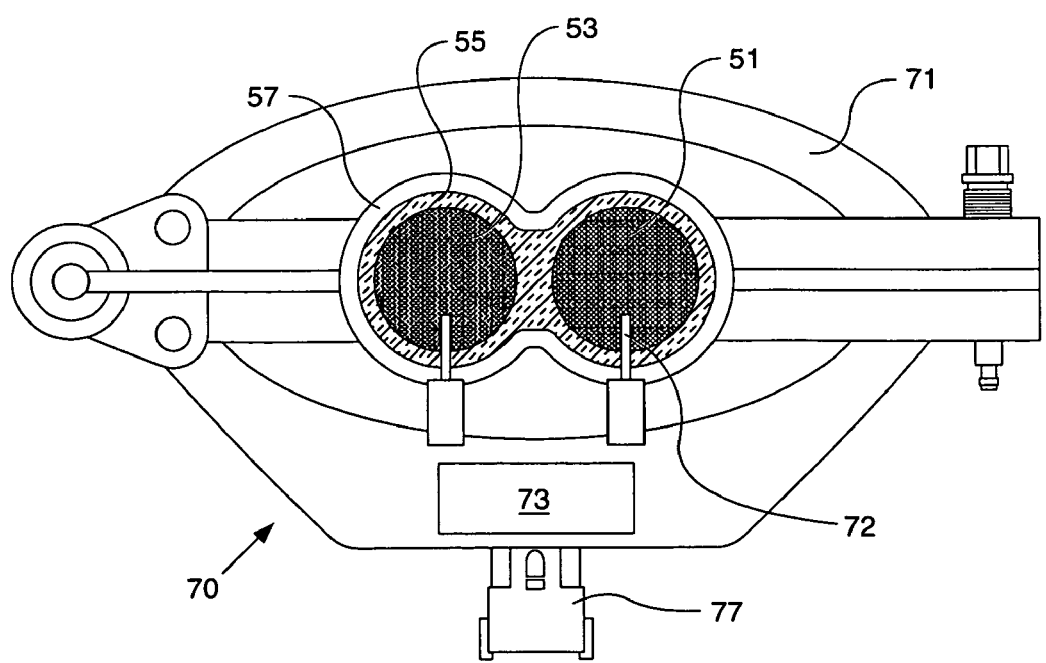
FIG. 4 is a cross section view of a smart connector plugged into the conductor according to one embodiment of the present disclosure.

FIG. 4 is a cross section view of a smart connector 70 connected to the conductor 50 according to one embodiment of the present disclosure. The smart connector 70 may comprise a housing 71, prongs 72, a smart chip 73, and a device connector 77. The smart connector 70 may be connected to the conductor 50 at any location along the conductor 50 where it may be desired to connect a device 60. The connection of a smart connector 70 may occur during assembly of the machine 10 or at a later time, such as when a new device 60 may be added.

Connection of the smart connector 70 to the power and data conductor 50 may require that the smart connector 70 have at least one prong 72 that may penetrate the insulation 55 and sheathing 57 of the conductor 50 and independently contact a corresponding at least one of the positive and/or negative lines 51, 53. As shown in FIG. 4, there are 2 prongs 72, one prong 72 to contact the positive line 51 and one prong 72 to contact the negative line 52.

Ensuring a proper connection may include techniques such as clearly marking the conductor 50 and the prongs 72 with positive or negative markings, color codes or other types of markings so that the correct polarity between the contacts is made. In one embodiment of the disclosure, the prongs 72 may assume the shape of knife-like structures with a predetermined curvature for easier penetration into the conductor 50. The use of finely stranded lines in the conductor 50 allows the prongs 72 to readily penetrate into the positive and negative lines 51, 53 for enhanced electrical contact. The housing 71 may also allow for a predetermined offset of the prongs 72 from the conductor 50 such that assembly of the housing 71 about the conductor 50 will ensure a proper depth of penetration of the prongs 72 into the conductor 50.

Although the prongs 72 may be required to penetrate the sheathing 57 and insulation 55, various techniques may be used to establish a good connection. To prevent electrical continuity between prongs 72, it may be desired to coat the prongs 72 such that only the part of the prong 72 penetrating the conductor 50 into the stranded portion is conductive. This may be done using coatings and the like about the part of the prong 72 that may be in contact with the sheathing 57 or insulation 55. For example, a coating may be applied to portions of the prongs 72 that may be in contact with the sheathing 57 or insulation 55 or a coating may be applied to all but the end of the prongs 72. The coating should be a material that provides electrical insulation.

The smart connector 70 may be configured such that a sealant, e.g., a gel-like substance, may be located on the smart connector 70 and released during the connection process to completely seal the connection from the environment as the housing 71 closes about the conductor 50. The sealant may also be capable of coating portions of the prongs 72 as they penetrate into conductor 50 thereby providing insulation of a portion of each prong 72. Alternatively, the sealant may be located within the conductor 50, for example between the sheathing 57 and the insulation 55. If the sheathing 57 becomes exposed to the environment, the sealant at that location may harden and thus provide a barrier to maintain the integrity of the conductor 50. Using a sealant that may be of a material that hardens upon exposure to air may also prevent physical damage in case the sheathing 57 becomes frayed.

Design of the conductor 50 and the smart connector 70 may also allow for various configurations of the conductor 50 within the housing 71. The conductor 50 and the housing 71 may be configured such that the positive line 51 may only fit on one side of the housing 71 and the negative line 53 may only fit on the other side of the housing 71, thus allowing only for a proper polarity connection. Alternatively, the housing 71 may be configured such that connection to the conductor 50 may be made with the positive and negative lines 51, 53 contacting either prong 72.

At least one of the top and base housings may include rubber grommets.

The smart connector 70 may be secured to the conductor 50 in any number of ways, including, but not limited to, adhesive, screws, bolts, clips, and the like. Securing the housing 71 to the conductor 50 by one of the above methods preferably maintains adequate connection in harsh environments.

Properly securing the housing 71 about the conductor 50 may equalize the compressive forces on the finely stranded wire bundle and may result in an overall stiffer region of the conductor 50. Having a stiffer region where the prongs 72 penetrate the conductor 50 may result in a reduction of fretting corrosion between the prongs and the finely stranded wire bundle of the conductor 50.

FIG. 5a is a perspective view of a smart connector 70 according to another embodiment of the present disclosure. This embodiment of the smart connector 70 may include a connector top housing 120 and a connector base housing 150 and may be connected at any location along the conductor 50 where it may be desired to connect a device. The connection may occur during assembly of the machine 10 or at a later time, such as when a new device 60 may be added.

The conductor 50 is shown extending from top housing first and second ends 122,124 and corresponding base housing first and second ends 152,154. The conductor 50 may be configured to extend along a longitudinal axis 115. The top and base housings 120,150 may also be configured to extend along this same longitudinal axis 115. A connector interface or a device connector 77 is shown protruding from the top housing 120 transverse the longitudinal axis 115 of the conductor 50. Although a single device connector 77 is shown, there may be additional device connectors 77 extending off the smart connector 70 to accommodate additional connections to the power and data conductor 50. The device connector 77 may also be configured to receive at least one connector pin 145 that may also extend transverse the longitudinal axis 115 of the conductor 50. While typical device connectors 77 may have three connector pins 145, the total number of connector pins 145 may be more or less than this.

The smart connector 70 may also be secured such that the top and base housings 120,150 provide a seal about the conductor 50. Although FIG. 5a depicts the top and base housings 120,150 being attached utilizing a plurality of mating clips 117, the top and base housings 120,150 may be attached in any number of ways, including, but not limited to, adhesive, screws, bolts, clips, and the like.

FIG. 5b is a perspective view of the smart connector in FIG. 5a with the connector top housing removed showing a circuit board 130, an intermediate layer 140, and a top housing seal 125. The intermediate layer may be any layer providing separation between the top housing 120 and base housing 150, and may be known as a potting layer. The top housing 120, circuit board 130, potting layer 140, and top housing seal 125 may all come pre-assembled such that the top housing 120 may be connected to the base housing 150 in a single step. The top housing seal 125 may be seated in a groove (not shown) in the top housing 120. Additionally, a portion of the area between the potting layer 140 and the top housing 120 may be filled with a potting material (shown in FIGS. 5f and 5g as 135) to surround the circuit board 130. The potting material 135 may be any material known in the art for use as a potting material 135. The potting layer 140 may then provide the separation between the top housing 120 and the base housing 150.

The circuit board 130 may have prong contacts 131 positioned to receive first and second contact prongs 165,175 through the potting layer 140. At least one connector pin 145 may also be attached to the circuit board and may be positioned to be received by the device connector 77. Locating apertures 133 may be configured in the circuit board 130 for receiving locating pins 142 from the potting layer 140 and locating pins (not shown) from the top housing 120. A potting aperture 134 may be located in the circuit board 130 for possible injection of the potting material.

Any of a variety of circuit boards 130 may depending on the complexity of the smart connector 70. The circuit board 130 may contain a number of devices, such as, but not limited to, processors, transmitters, receivers, contact devices, etc. For mere electrical conveyance, a circuit board 130 may not be used. For more complex applications, the circuit board 130 may have heat generating devices (not shown) that may require heat sink contacts 195 to conductively transfer heat to heat sinks 190 mounted external to the top housing 120.

Figure 5C:
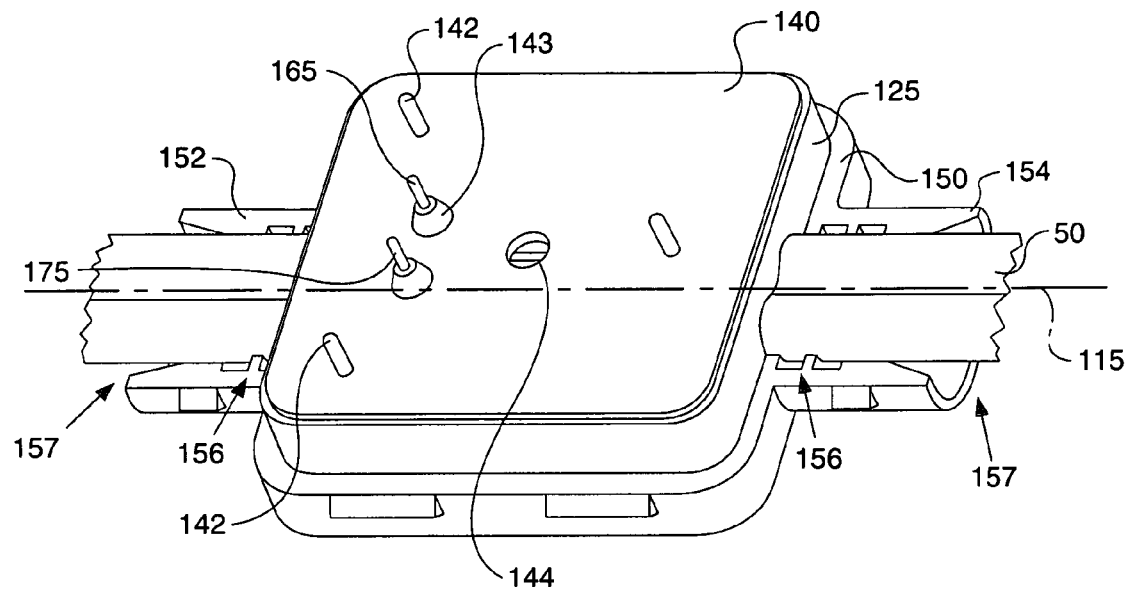
FIG. 5c is a perspective view of the smart connector in FIG. 5a with a connector top housing and a circuit board removed.

FIG. 5c is a perspective view of the smart connector 70 in FIG. 5a with the connector top housing 120 and circuit board 130 removed showing the potting layer 140. The potting layer 140 may have locating pins 142 that may be received by locating apertures 133 in the circuit board 140. The potting layer 140 may also have a potting aperture 144 that lines up with the circuit board potting aperture 134 for injection of the potting material. The potting layer 140 may also have prong guides 143 to receive contact prongs 165,175 through the potting layer 140.

Figure 5D:
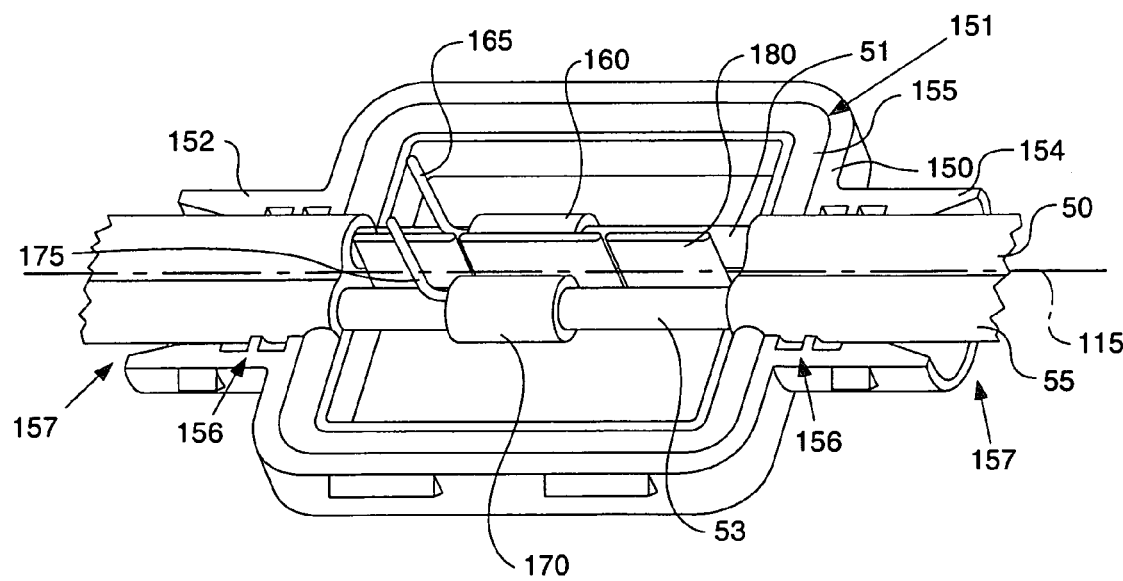
FIG. 5d is a perspective view of the smart connector in FIG. 5a with a connector top housing, circuit board and potting layer removed.

FIG. 5d is a perspective view of the smart connector 70 in FIG. 5a with the connector top housing 120, circuit board 130, and potting layer 140 removed showing the conductor 50 arranged along the longitudinal axis 115 of the smart connector 70. The base housing 150 is shown to have first and second ends 152,154. Each of the first and second ends 152,154 is shown to have a base conductor channel 157 to receive and locate the conductor 50. The base conductor channels 157 may have a base clamping portion 156 that may engage the insulation 55 of the conductor 50. Although the base clamping portion 156 is shown here as ribs or risers, the base clamping portion 156 may be configured using any of a number of ways known in the art to engage the conductor 50. Each of the base conductor channels 157 in the first and second ends 152,154 may also be outwardly flared about the conductor 50. The base housing 150 may also have a groove 151 to receive a base housing seal 155 and to engage the conductor 50.

As is shown in FIG. 5d, a portion of the insulation 55 has been removed to expose the positive and negative lines 51,53 of the conductor 50. Removal of the insulation 55 may be accomplished in any of a number of ways. A conductor contact 160,170 may be attached to each corresponding line 51,53 of the conductor 50 in any of a number of ways, such as crimping, welding, soldering, and the like. Each conductor contact 160,170 may have a corresponding prong 165,175 extending transverse the longitudinal axis 115. A conductor partition 180 may positioned in the base housing 150 between the positive and negative lines 51,53 of the conductor 50.

Figure 5E:
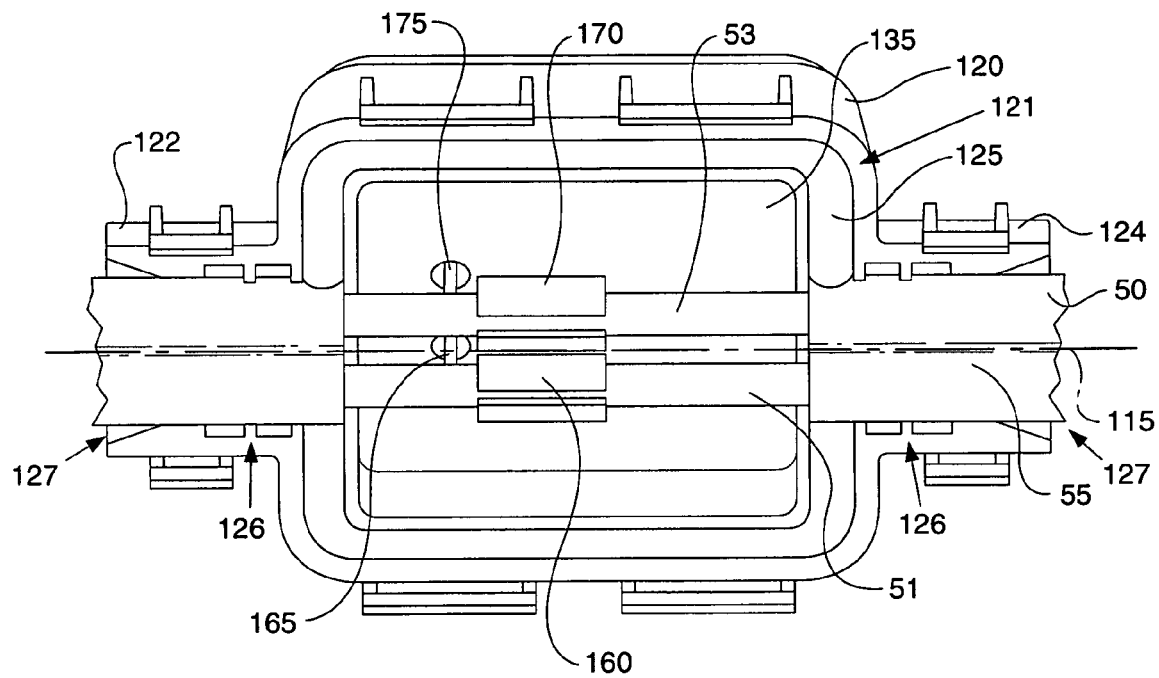
FIG. 5e is a perspective view of the smart connector of FIG. 5a with a connector base housing removed.

FIG. 5e is a perspective view of the smart connector 70 of FIG. 5a with the connector base housing 150 removed. The top housing 120 is shown to have first and second ends 122, 124. Each of the first and second ends 122,124 is shown to have a top conductor channel 127 to receive and locate the conductor 50. The top conductor channels 127 may have a top clamping portion 126 that may engage the insulation 55 of the conductor 50. The top conductor channels 127 and clamping portions 126 may be configured to correspond to the base conductor channels 157 and clamping portions 156. Each of the top conductor channels 127 in the first and second ends 122,124 may also be outwardly flared about the conductor 50 corresponding to the base conductor first and second ends 152,154. The top housing 120 may also have a top housing seal 125 in a groove 121 that may correspond to the base housing seal 155 and may be configured to engage the base housing seal 155 and the conductor 50.

FIGS. 5f and 5g are respective cross section diagrams of the smart connector 70 of FIG. 5a parallel to and perpendicular to longitudinal axis 115 of the conductor 50. Although the potting material 135, as mentioned above, is shown to be present in the space between the top housing 120 and the potting layer 140, the potting material 135 may be used in any portion of the connector 50.

FIGS. 5f and 5g also show a connector mount 197 on a surface of the base housing 150. The smart connector 70 may be mounted to a machine or other structure in one of a number of ways in the art, including by adhesive, straps, mechanical means, and the like. This may depend on the materials used to construct the top and base housings 120,150 of the smart connector 70.

The smart connector 70 may connect to and make electrical contact with a device 60 by way of a device connector 77. The device connector 77 may be a pigtail connector or some other such connector suitable for the task. Alternatively, the device 60 may be connected to a smart chip 73a directly without any intermediate connector.

Figure 6A:
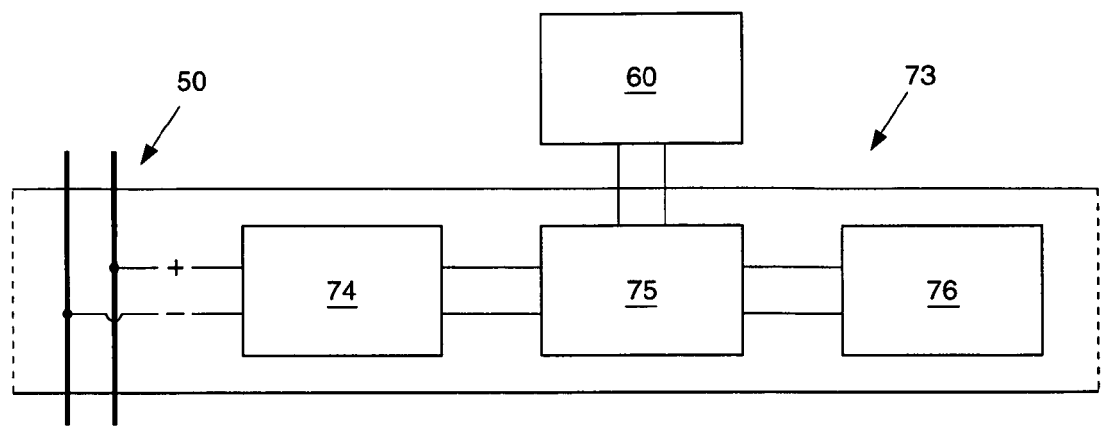
FIG. 6a is a block diagram of a smart chip connected to the conductor according to one embodiment of the present disclosure.

FIG. 6a is a block diagram of a smart chip 73 connected to the conductor according to one embodiment of the present disclosure. The smart chip 73 may comprise an optional contact device 74, a receiver/transmitter 75 and a processor 76. The contact device 74 may be located on the smart connector 70 to sense voltage polarity and may either provide an indication of a correctly polarized connection or reverse the polarity if not correct.

The processor 76 may be programmed from a controller 28 through the receiver/transmitter 75, may be pre-programmed to recognize connection to a new device 60, may be programmed from the device 60 itself, or may be programmed utilizing any other device 60 having programming capability. A message may then be sent to a display 26 notifying the operator of a changed condition based on the programming. The changed condition may then be approved or denied based on an operator input or a predetermined system protocol. The smart connector 70 may then be enabled to communicate information through the conductor 50.

The smart connector 70 may transmit commands, inquiries, or other data to the device 60, and also receive data from the device 60. The smart connector 70 may then communicate by way of the conductor 50 to other smart connectors 70, devices 60, or the controller 28. When a communication is sent over the conductor 50, the communication may be available for all smart connectors 70 to review. However, only the smart connector 70 to which the communication is addressed will normally utilize the information. Although the signal may attenuate over time, the communication may remain on the conductor 50 indefinitely until filtered out by a signal attenuation device 65. The signal attenuation device 65 may filter or impede communications over a period of time such that the communication may be attenuated to an insignificant value, leaving the bandwidth of the conductor 50 available for new communications.

The smart connector 70 or the smart chip 73 may be available as off the shelf products. Thus, the smart connector 70, by use of standard components, may be a generic, interchangeable product.

The smart connector 70 may have built-in current limiting capabilities. The processor 76 may be programmed such that it may detect the current flowing to the device 60 and determine if the current is within tolerance. If the current is not within tolerance, the processor 76 may then stop or limit current flow to the device 60. The processor 76 may also send an out of tolerance message to an operator. Alternative means for limiting current flow may be used, such as resistors, capacitors, transistors, fuses, breakers, shunt devices, and the like.

The processor 76 may be programmed such that it may send communications over the conductor 50 on a predetermined frequency. This predetermined frequency may be operator selected based on a desired frequency, may be selected based on available bandwidth, or may be selected based on some other criteria, such as system condition, location, available communication means, regulated restrictions, and the like. Alternatively, the communication may be sent in multiple redundant packets using a plurality of frequencies or a plurality of communication protocols.

Figure 6B:
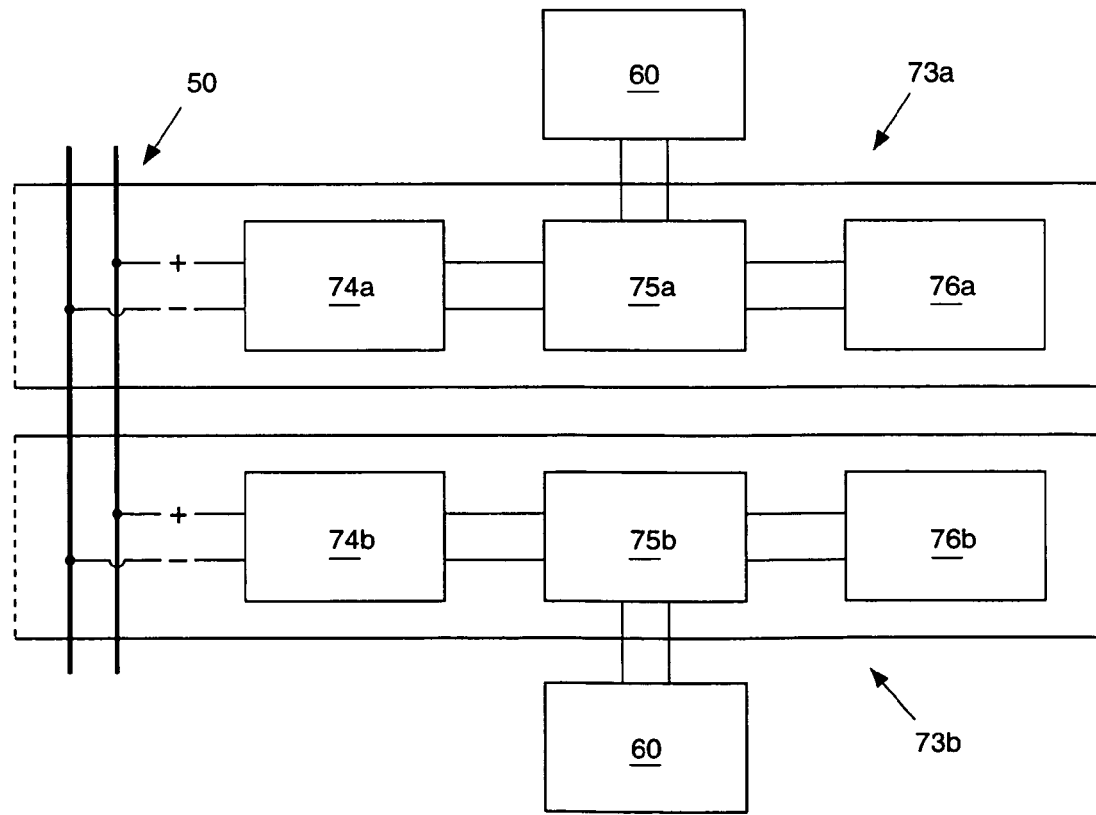
FIG. 6b is a block diagram of two smart chips connected to the conductor according to one embodiment of the present disclosure.

FIG. 6*b* is a block diagram of two smart chips 73*a*, 73*b* connected to the conductor 50 according to one embodiment of the present disclosure. A first processor 76*a* may send redundant packets to a second processor 76*b*. The second processor 76*b* receiving the redundant packets may compare the multiple communications for data integrity. The data may be considered completely and accurately delivered based on comparing the multiple communications with each other. For example, the communication may be sent redundantly over three separate frequencies, and a data match of at least two communications may indicate successful transmission. The number of required matches may depend on the type of data, the importance of the data, the speed required for data transfer, system conditions, external conditions, and the like. The second processor 76*b*, upon determining a successful transmission of data, may send a confirmation of data received. The confirmation may be sent to the first processor 76*a* or to a display 26 to provide notice to an operator. If the transmission of data is determined to be unsuccessful, i.e. the required number of matches is not received, the second processor 76*b* may notify either the first processor 76*a*, the operator, a designated source, or the like. In addition, the second processor 76*b* may ask for a re-transmission of the data. Because of either the lack of confirmation, a request for re-transmission, etc., the first processor 76*a* may recognize that the data is not being received by the second processor 76*b* and may then choose to send the data over different frequencies or in differing numbers of packets. This may continue until the data is received, the request is canceled, the operator is notified of the condition, and the like.

The display 26 may be configured to provide real-time, visual feedback on machine operating conditions. This may be used to ensure the best performance of the machine 10 and to assist in troubleshooting. The conductor 50 allows for multiple communication data links to be utilized in providing real-time performance and operating information while the machine 10 is in use. Alternatively, the information may be logged for future review. The display 26 may also be capable of showing one or more of the devices 60 that may be connected to the machine 10. This display 26 may also be configurable or re-configurable without changing out the hardware. Re-configuration may allow changes to the display 26 without utilizing additional current carrying devices.

Figure 7:
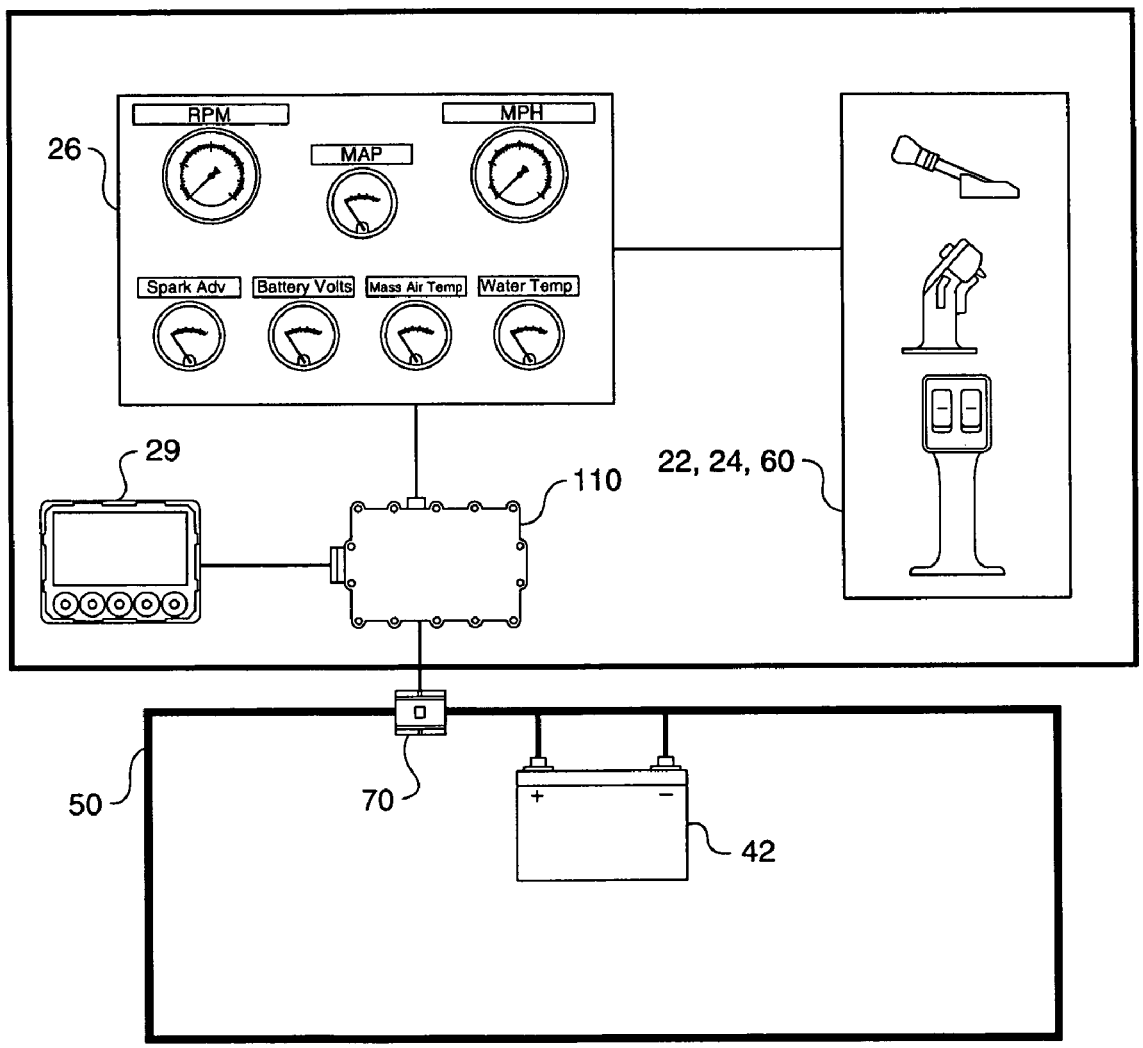
FIG. 7 shows diagrammatically a power and data delivery system according to another embodiment of the present disclosure.

FIG. 7 shows diagrammatically a power and data delivery system 40 according to another embodiment of the present disclosure. In this embodiment, one smart connector 70 on the conductor 50 is connected to an operator interface station 100. The operator interface station 100 comprises an operator interface controller 110, a display 26, operator control devices 22, 24, 60, and software loading interface 29.

The software loading interface 29 may be available to allow an operator to load software and configure or reconfigure new and existing devices 60. The software loading interface 29 may also indicate the software programmed in each smart connector 70. Alternatively, this may be done automatically as mentioned above as devices 60 are connected to the conductor 50.

The display 26 in this embodiment may comprise a virtual dashboard display. The virtual display 26 may be configured to display various machine operator conditions, including RPM, speeds, temperatures, battery information, fuel indications, and the like. The display 26 may come pre-programmed from the manufacturer and have various configurable setups to select from or may be configurable to the owner's or operator's preferences. A virtual dashboard display 26 may eliminate the need for dedicated inputs. This may provide for reduced electrical power consumption, less wiring, and a greater overall system capacity. The display 26 may also be all or partly software based. This allows for the monitoring or control equipment to be consistent across product lines and machines.

FIG. 8 shows diagrammatically a power and data delivery system 40 according to another embodiment of the present disclosure. Because the conductor 50 may be configured in a loop, a first smart connector 70*a* may transmit data on the conductor 50 to a second smart connector 70*b* that will travel in both directions from the first smart connector 70A. If a break 90 occurs in the conductor 50, the signal will only continue on the conductor until it reaches the break 90, at which time the signal will become fully attenuated. However, because of the loop configuration, the signal will still be capable of reaching the second smart connector 70*b* should a break 90 occur. Furthermore, a diagnostic mode may be built into the power and data delivery system 40 to assist in determining when and where a break 90 may have occurred in the conductor 50. For example, each smart connector 70 along the conductor 50 may be prompted to acknowledge receipt of a test signal. Failure to acknowledge by any smart connector 70 may indicate a smart connector malfunction or a break in the conductor 50. Further such diagnostic inquiries may yield more specific information.

FIG. 9 shows diagrammatically a power and data delivery system 40 according to another embodiment of the present disclosure. Although the conductor 50 as discussed and as shown in FIG. 1 is shown in a loop configuration, it may be arranged in other acceptable configurations known in the art such as spider or straight-line configurations. Alternatively, the configuration may be similar to that shown in FIG. 8. FIG. 8 shows a two-loop configuration wherein a first conductor 80 and a second conductor 85 are in communication with one another via smart connectors 70 on each loop connected by a device connector 77. In this embodiment, power and data may be transferred from the first conductor 80 to the second conductor 85 and thereby to the devices 60 on the second conductor 85. Alternatively, the second conductor 85 may also have a second power supply (not shown) to provide power to devices 60 on the second conductor 85. In this embodiment, the connection between the first and second conductors 80, 85 may be wired as described above or may be wireless using technologies such as, but not limited to, satellite or GPS, radio frequency (RF), cellular, and the like.

INDUSTRIAL APPLICABILITY

The power and data delivery system 40 comprises a power supply 42, a conductor 50, smart connectors 70, and devices 60. After the system 40 is arranged on a machine 10, smart connectors 70, generally configured within housings 71, may be attached to the conductor 50 in locations near where devices 60 may desirably be located. The devices 60 may be attached to the smart connectors 70 through device connectors 77 that may allow for the transfer of power and data from the conductor 50 to the devices 60 through the smart connectors 70.

The present disclosure provides an improved system and method for power and data delivery on a machine 10. This system and method negate the need for today's cumbersome wiring harnesses, and enable greatly reduced costs due to reductions in the number of components and standardization of many key parts. Routing of the conductor 50 may be made substantially easier because of its reduced size and weight, thereby simplifying such tasks as making connections to devices, troubleshooting the system and devices, and adding devices as desired. This system and method makes upgrading older machines much easier and cost efficient. EMI may also be minimized due to the nature of the system configuration, i.e. the ability of having drivers close to driven devices, and the ability to send communications over multiple frequencies. The system 40 may also have the ability to perform additional functions. These functions may comprise power sharing, regeneration, high level diagnostics and prognostics, fuzzy logic based learning for performance optimization, site management, and other functions that, because of previous wiring configurations such as wiring harnesses, were too complex and burdensome to be done.

Embodiments of the present disclosure are applicable to a number of machines 10 where both power and data may be routed to devices 60 connected to those machines 10. FIG. 10 is a flow diagram depicting steps of operation of a power and data delivery system 40 according to one embodiment of the present disclosure. Once an operator initiates a command in a first control block 200, the command may be sent to a controller, as depicted in a second control block 210. According to the controller protocol, the controller command may be transmitted via the conductor 50 to a smart connector 70 for a device 60, as shown in a third control block 220. The smart connector 70 may then process the controller command and send instructions to the device 60 as a function of the controller command, as shown in a fourth control block 230. The device 60 may then perform the desired task according to its instructions, as shown in a fifth control block 240. The smart connector 70 may then determine if the task was performed successfully, as shown in a sixth control block 250 and transmit an acknowledgement through the conductor 50 to the controller 28, as shown in a seventh control block 260. Upon receipt of acknowledgement, the controller 28 may then send the acknowledgement to a display 26 for the operator to view, as shown in an eighth control block 270.

As an example of a particularly complex application of the present disclosure, a machine 10, such as a wheel loader, may be used to perform a lift function in which lift and tilt cylinders are controlled in coordination with one another for a process known as level lift. For example, as the machine 10 is used to pick up and drop off loads with the implement 14, various communications may occur within the system 40 to effectuate that movement. As the lift control device 22 is moved by the operator, the smart connector for the lift control device 22 may transmit a command through the conductor 50 for the lift cylinder 32. The smart connector for the lift cylinder 32 may then receive the command and cause the lift cylinder 32 to actuate. The smart connector for the lift cylinder 32 may then transmit data through the conductor 50 for the requesting smart connector confirming that the lift cylinder 32 is actuating.

The smart connector for the lift control device 22 may also transmit a request through the conductor 50 to query a position sensor (not shown) for the lift cylinder 32. Based on the query, the position sensor may make a reading and transmit that reading through the conductor 50 for the requesting smart connector. The smart connector for the lift control device 22 may then know the amount of extension of the lift cylinder 32 in relation to the tilt cylinder 34 and begin to transmit a command for the tilt cylinder 34 to actuate.

The smart connector for the tilt cylinder 34 may then receive the command and cause the tilt cylinder 34 to actuate. The smart connector connected to the tilt cylinder 34 may then transmit data through the conductor 50 for the smart connector for the lift control device 22 confirming that the tilt cylinder 34 is actuating.

The smart connector for the lift control device 22 may then transmit a request through the conductor 50 to query a position sensor (not shown) for the tilt cylinder 34. Based on the query, the position sensor may make a reading and transmit the reading through the conductor 50 for the requesting smart connector. The smart connector for the lift control device 22 may then know the amount of extension of the tilt cylinder 34 in relation to the lift cylinder 32.

The aforementioned communications may then continue to happen causing the implement 14 to maintain a level lift. All of the above communications may be made nearly simultaneously and the data for the movements may be traveling over the same conductor 50 at the same time. Furthermore, communications for other systems or subsystem of the machine 10, such as an engine control system, will also be passing data across the conductor 50 simultaneously to the data communications for a level lift.

A power and data delivery system 40 may also find application with a first conductor 80 found on a truck, i.e., a tractor of a tractor-trailer, and a second conductor 85 found on a trailer capable of operable connection to the truck. This application is similar to the embodiment of the present disclosure as shown in FIG. 9. The first conductor 80 may be capable of carrying power and data to a number of devices 60 on the truck including, but not limited to, lights, brakes, the engine, sensors, displays, etc. The second conductor 85 may be capable of carrying power and data to a number of devices 60 on the trailer including, but not limited to, controller 28, lights, brakes, GPS, climate control, etc.

Upon connection between the first and second conductors 80, 85, the controller 28 may be capable of recognizing that the smart connector 70 on the first conductor 80 is connected to another smart connector 70 on the second conductor 85. This connection may cause power and data to be carried to the second conductor 85 and allow for activation of the devices 60 on the second conductor 85. Alternatively, and as mentioned above, the connection between the first conductor 80 and the second conductor 85 may be done wirelessly. This may be done using GPS or RF electronics and may be based upon proximity of the trailer to the truck. Having GPS may also allow for additional functionality of the machines 10. GPS may assist in machine security as well as conformance with regulations based on machine location.

GPS and/or RF technology may allow for the presence of conductors 50 on separate mobile machines 10, such as two wheel loaders, wherein each wheel loader may have proximity alarms or warnings notifying the operators of another nearby machine 10. Having multiple conductors 50 may also simplify the arrangement of wiring on articulated machines where all wiring on a rear portion of the machine 10 must pass through the articulated joint. Separate conductors 50 may allow for a single device connector 77 between the conductor in the front portion and the rear portion of an articulated machine.

It will be apparent to those skilled in the art that various modifications and variations can be made in the system and method of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

LIST OF ELEMENTS

TITLE: SYSTEM AND METHOD FOR POWER AND DATA DELIVERY ON A MACHINE
FILE: 04-359
10 machine
14 implement
16 lift mechanism
20 operator control station
22 lift control device
24 steering control device
26 display
28 controller
29 software loading interface
30 lift linkage
32 lift cylinder
34 tilt cylinder
40 power and data delivery system
42 power supply
50 conductor
51 positive line
53 negative line
55 insulation
57 sheathing
60 device
65 signal attenuation device
70 smart connector
70a first smart connector
70b second smart connector
71 housing
72 prongs
73 smart chip
73a first smart chip
73b second smart chip
75 contact device
74a first contact device
74b second contact device
75 receiver/transmitter
75a first receiver/transmitter
75b second receiver/transmitter
76 processor
76a first processor
76b second processor
77 device connector
80 first conductor
85 second conductor
90 break
100 operator interface station
110 operator interface controller
115 longitudinal axis
117 mating clips
120 connector top housing
121 top housing groove
122 top housing first end
124 top housing second end
125 top housing seal
126 top clamping portion
127 top conductor channel
130 circuit board
131 prong contacts
133 circuit board locating aperture
134 circuit board potting aperture
135 potting material
140 potting layer
142 locating pin
143 prong guide
144 potting aperture
145 connector pin
150 connector base housing
151 base housing groove
152 base housing first end
154 base housing second end
155 base housing seal
156 base clamping portion
157 base conductor channel
160 first conductor contact
165 first conductor contact prong
170 second conductor contact
175 second conductor contact prong
180 conductor partition
190 heat sink
195 heat sink contacts
197 connector mount

What is claimed is:

1. A connector for a power and data delivery system, comprising:
a base housing having a longitudinal axis, the base housing including:
a base conductor channel extending along the longitudinal axis and providing a through path for a combined power and data delivery conductor; and
at least one conductor contact having at least one corresponding prong extending transverse the longitudinal axis; and a top housing, including:
- a top conductor channel corresponding to the base conductor channel;
- a circuit board positioned to receive the at least one prong, the circuit board having at least one connector pin, the circuit board including a first processor and a second processor; and
- a connector interface positioned to receive the at least one connector pin;

wherein the circuit board is configured to separate a power signal from a data signal, the first processor is configured to send redundant packets to the second processor, and the second processor is configured to compare the redundant packets for integrity.

2. The connector of claim 1, wherein the conductor includes two or more wires; and
   wherein the base housing includes a conductor partition extending along the longitudinal axis.

3. The connector of claim 1, wherein the base housing and the top housing provide a seal about the conductor when the base housing is connected to the top housing.

4. The connector of claim 1, wherein the top and base conductor channels each have a first and a second end, at least one of the first and second ends being flared outwardly.

5. The connector of claim 4, wherein at least one of the top and base conductor channels include a clamping portion.

6. The connector of claim 1, wherein at least one of the top and base conductor channels have a clamping portion.

7. The connector of claim 6, wherein the clamping portion engages the conductor when the base housing is connected to the top housing.

8. The connector of claim 1, wherein the top housing further includes a potting layer separating the top housing from the base housing, the potting layer having at least one prong guide.

9. The connector of claim 8, wherein the circuit board is positioned between the top housing and the potting layer to receive the at least one prong through the at least one prong guide.

10. The connector of claim 9, wherein the space between the potting layer and the top housing contains a potting material.

11. The connector of claim 1, wherein the circuit board further includes at least one of a transmitter, a receiver, and a contact device.

12. The connector of claim 1, wherein the top housing further includes a heat sink, the heat sink being operably connected to the circuit board through the top housing.

13. The connector of claim 3, wherein an electrical connection is made at the connector interface.

14. The connector of claim 3, wherein the connector is operable to selectively transfer at least one of power and data signals between the conductor and a device.

15. The connector of claim 14, wherein the connector interface is configured to be connected to the device at a device interface.

16. The connector of claim 3, wherein at least one of the top and base housings include rubber grommets.

17. The connector of claim 1, wherein the at least one conductor contact is configured about a portion of the conductor.

18. A method for attaching a connector to a conductor, comprising:
- attaching a conductor contact to each of at least one conductor wire, the conductor contact having a prong extending transverse a longitudinal axis of the conductor;
- positioning the conductor in a base conductor channel of a base housing located along the longitudinal axis;
- positioning a circuit board in a top housing, the circuit board including a first processor and a second processor; and
- attaching the top housing to the base housing such that each prong extends through the top housing to a connector interface;

wherein the circuit board is configured to separate a power signal from a data signal, the first processor is configured to send redundant packets to the second processor, and the second processor is configured to compare the redundant packets for integrity.

19. The method as set forth in claim 18, further comprising:
removing a portion of an insulation from each conductor wire.

20. The method as set forth in claim 19, wherein the step of positioning the conductor in the base conductor channel of the base housing includes separating each conductor wire from the other conductor wires with a conductor partition.

21. The method as set forth in claim 18, further comprising:
providing a seal about the conductor as the top housing is attached to the base housing.

22. The method as set forth in claim 18, wherein the step of positioning the circuit board in the top housing includes positioning the circuit board between the top housing and a potting layer.

23. The method as set forth in claim 22, wherein positioning the circuit board further includes:
- positioning the circuit board to receive each prong; and
- arranging at least one connector pin on the circuit board to be received by the connector interface.

24. The method as set forth in claim 22, further including:
inserting a potting material in a space about the circuit board between the top housing and the potting layer.

25. A power and date delivery system for a machine, comprising:
- a conductor located throughout at least a portion of the machine;
- a plurality of connectors, each connected to the conductor at a respective desired location, each connector including:
  - a base housing;
  - a top housing configured to connect to the base housing and contain a portion of the conductor; and
  - a circuit board including a first processor and a second processor located in the top housing; wherein the circuit board is configured to electrically connect to the conductor and to separate a power signal from a data signal, the first processor is configured to send redundant packets to the second processor, and the second processor is configured to compare the redundant packets for integrity; and
- a plurality of devices, at least one being connected to a corresponding one of the plurality of connectors and controlled by one of the first processor or the second processor;

wherein the desired location may be located at any point along the conductor.

26. The power and data delivery system of claim 25, wherein each connector controls actuation of the connected device.

27. The power and data delivery system of claim 25, wherein each connector is operable to transfer at least one of the power and data signals between the conductor and the connected device.

28. The power and data delivery system of claim 25, wherein the plurality of connectors are operable to transfer at least one of power and data signals over the conductor.

* * * * *